United States Patent
Onderko et al.

(10) Patent No.: US 7,221,269 B2
(45) Date of Patent: May 22, 2007

(54) SELF-ADJUSTING PORTALS WITH MOVABLE DATA TAG READERS FOR IMPROVED READING OF DATA TAGS

(75) Inventors: John Christian Onderko, Appleton, WI (US); Michael Donald O'Shea, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 212 days.

(21) Appl. No.: 10/976,993

(22) Filed: Oct. 29, 2004

(65) Prior Publication Data

US 2006/0092014 A1 May 4, 2006

(51) Int. Cl.
*G08B 1/08* (2006.01)

(52) U.S. Cl. ............... 340/539.13; 340/572.1; 340/572.8

(58) Field of Classification Search ........... 340/539.13, 340/572.1, 572.8
See application file for complete search history.

(56) References Cited

U.S. PATENT DOCUMENTS

| 3,832,530 | A | 8/1974 | Reitboeck et al. |
| 4,135,184 | A | 1/1979 | Pruzick |
| 4,833,591 | A | 5/1989 | Eckl |
| 5,221,831 | A | 6/1993 | Geiszler |
| 5,771,657 | A | 6/1998 | Lasher et al. |
| 6,094,173 | A | 7/2000 | Nylander |
| 6,351,215 | B2 | 2/2002 | Rodgers et al. |
| 6,669,089 | B2 | 12/2003 | Cybulski et al. |
| 6,687,609 | B2 | 2/2004 | Hsiao et al. |
| 6,696,954 | B2 | 2/2004 | Chung |
| 6,703,935 | B1 | 3/2004 | Chung et al. |
| 6,750,769 | B1 | 6/2004 | Smith |
| 6,765,476 | B2 | 7/2004 | Steele et al. |
| 6,946,950 | B1 * | 9/2005 | Ueno et al. ............... 340/10.1 |
| 6,957,777 | B1 * | 10/2005 | Huang ....................... 235/492 |
| 6,958,677 | B1 * | 10/2005 | Carter ....................... 340/10.1 |
| 7,053,775 | B2 * | 5/2006 | Moore ...................... 340/572.1 |
| 7,081,818 | B2 * | 7/2006 | Eckstein et al. .......... 340/572.1 |
| 2002/0044058 | A1 | 4/2002 | Heinrich et al. |
| 2002/0050518 | A1 | 5/2002 | Roustaei |
| 2002/0104013 | A1 | 8/2002 | Ghazarian |
| 2002/0147042 | A1 | 10/2002 | Vuong et al. |

(Continued)

FOREIGN PATENT DOCUMENTS

DE 298 00 833 U1 4/1998

(Continued)

OTHER PUBLICATIONS

"Avante—RFID Access Portals", http://www.aitechnology.com/aventetech/home.html, printed Mar. 10, 2005, 4 pages, AIT, Inc., USA.

(Continued)

*Primary Examiner*—Daryl C Pope
(74) *Attorney, Agent, or Firm*—Senniger Powers

(57) ABSTRACT

Moving data tag readers in a portal responsive to a moving article to improve reading of a data tag on the article. Position sensors determine position information for the moving article. A controller module translates a positioning device having a data tag reader mounted thereon responsive to the determined position information. Moving the data tag reader provides improved reading of the data tag on the moving article.

47 Claims, 3 Drawing Sheets

U.S. PATENT DOCUMENTS

| | | |
|---|---|---|
| 2002/0180588 A1 | 12/2002 | Erickson et al. |
| 2002/0196126 A1 | 12/2002 | Eisenberg et al. |
| 2003/0003997 A1 | 1/2003 | Vuong et al. |
| 2003/0117268 A1 | 6/2003 | Hewitt et al. |
| 2003/0125836 A1 | 7/2003 | Chirnomas |
| 2003/0146233 A1 | 8/2003 | Chirnomas |
| 2003/0174099 A1 | 9/2003 | Bauer et al. |
| 2003/0183699 A1 | 10/2003 | Masui |
| 2003/0195043 A1 | 10/2003 | Shinners et al. |
| 2003/0233189 A1 | 12/2003 | Hsiao et al. |
| 2004/0002894 A1 | 1/2004 | Kocher |
| 2004/0004577 A1 | 1/2004 | Forster |
| 2004/0016796 A1 | 1/2004 | Hanna et al. |
| 2004/0027180 A1 | 2/2004 | Usami |

FOREIGN PATENT DOCUMENTS

| | | |
|---|---|---|
| EP | 04345424 | 1/1992 |
| EP | 0 962 407 A1 | 12/1999 |
| EP | 1 388 810 A2 | 2/2004 |
| FR | 2 794 550 A | 12/2000 |
| WO | WO 97/24689 A1 | 7/1997 |
| WO | WO 01/45063 A1 | 6/2001 |
| WO | WO 02/03340 A1 | 1/2002 |
| WO | WO 02/19285 A2 | 3/2002 |
| WO | WO 02/099730 A2 | 12/2002 |
| WO | WO 03/098528 A2 | 11/2003 |
| WO | WO 03/107030 A2 | 12/2003 |

OTHER PUBLICATIONS

Linday, Jeff et al., "Retail RFID Systems Without Smart Shelves", Nov. 7, 2003, 16 pages.

"Portal Reader", http://www.pelicansystems.co.uk/industrialcontrol/rfid_portalreader.asp, printed Mar. 4, 2005, 2 pages, Pelican Control Systems Ltd., England.

* cited by examiner

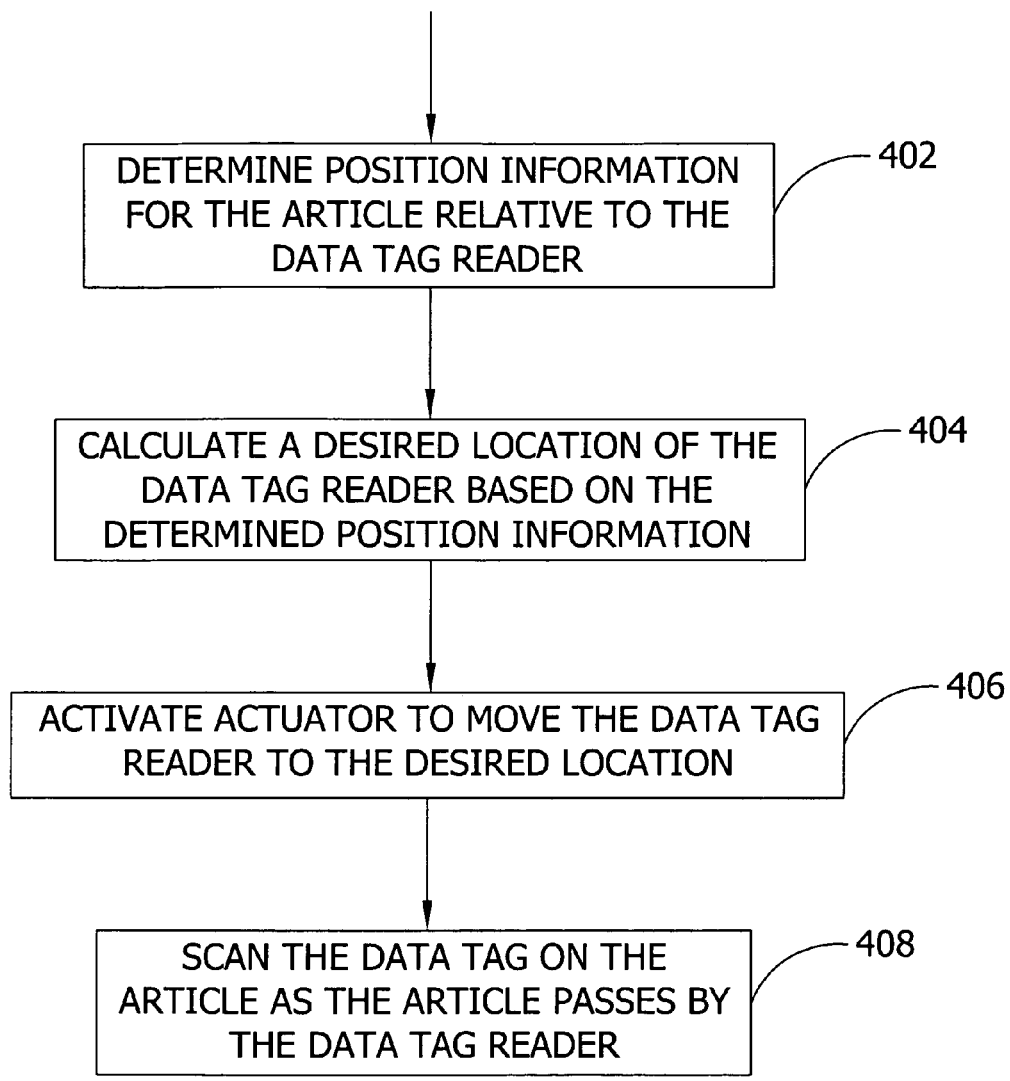

SELF-ADJUSTING PORTALS WITH MOVABLE DATA TAG READERS FOR IMPROVED READING OF DATA TAGS

TECHNICAL FIELD

Embodiments of the present invention relate to the field of article identification and tracking. In particular, embodiments of this invention relate to identifying an article using a self-adjusting portal having movable data tag readers.

BACKGROUND OF THE INVENTION

Data tag technology such as radio frequency identification (RFID) technology refers to passive smart tags (miniature antenna-containing tags requiring no internal power supply) that may be embedded in or attached to a product or material to convey information that may be read by a scanner. Generally, conductive or passive smart tags include a data circuit and an antenna. In particular, smart tags include a semiconductor, a coiled, etched, or stamped antenna, a capacitor, and a substrate on which the components are mounted or embedded. A protective covering is typically used to encapsulate and seal the substrate.

In general, RFID systems and other data tag systems include readers and tags in which the tags generate an electromagnetic response to an electronic signal from a reader. The response signal is read by the reader, typically with a readable range on the order of a few feet, though broader or narrower ranges are possible. The signal generated by the tag includes information (e.g., an electronic product code) that identifies the tag or the article comprising the tag.

RFID technology for use in the supply chain typically involves the use of portals through which goods must pass. The portals are equipped with RFID readers that can read the RFID tags on the pallets, cases, or individual items that pass through the portal. In prior configurations, the readers in the portal have been fixed at predetermined locations. However, different materials may not be read properly or the tag location is not optimized for reading. Further, for different types of materials to be read, improved reading or improved hardware efficiency may be achieved through adjustment in the location of the readers.

Accordingly, a system for self-adjusting RFID portals having movable RFID readers to improve RFID tag reading is desired to address one or more of these and other disadvantages.

SUMMARY OF THE INVENTION

Embodiments of the invention include self-adjusting portals having movable data tag readers. The location of one or more data tag readers is automatically adjusted based on information about approaching articles with data tags to be read. For example, the information may specify material type, material dimensions, data tag location, and/or a location of the article within the portal. In an embodiment, the invention operates responsive to a feed-forward system for anticipating articles or goods moving toward the portal, or in response to readings made by the portal itself or by other sensors.

In one form, a system reads a data tag on an article as the article is moving relative to a base. The system includes a positioning device that is movably mounted on the base. The system also includes a data tag reader mounted on the positioning device. The data tag reader is adapted to read a data tag mounted on the moving article. The positioning device is configured to move relative to the base and responsive to position information of the article relative to the reader for improved reading of the data tag.

In another form, a system reads a data tag on an article as the article is moving relative to a data tag reader. The system includes a data tag reader for reading the data tag. The system also includes a processor configured for determining, responsive to article data, a desired movement of the data tag reader relative to the data tag. The system also includes an interface for receiving data describing the desired movement determined by the processor. The system also includes a carriage connected to the interface. The data tag reader is mounted on the carriage. The carriage is capable of the desired movement.

In still another form, a system reads a data tag on an article as the article is moving relative to a data tag reader. The system includes a data tag reader for reading the data tag. The system also includes an interface for receiving article data and a processor configured for determining, responsive to the article data received by the interface, a desired movement of the data tag reader relative to the data tag. The system also includes a carriage. The data tag reader is mounted on the carriage. The carriage is capable of the desired movement determined by the processor.

In yet another form, a computer-implemented method adjusts the position of a data tag reader relative to a data tag to improve the readability of the data tag by the data tag reader. The computer-implemented method includes determining position information for the article relative to the data tag reader and moving the data tag reader responsive to the determined position information to improve reading by the data tag reader of the data tag on the moving article.

In another form, one or more computer-readable media have computer-executable components for improving the readability of a data tag on an article moving relative to a data tag reader. The components include a sensor module for determining position information for the article relative to the data tag reader. The components also include a controller module for moving the data tag reader responsive to the position information determined by the sensor module to improve reading by the data tag reader of the data tag on the moving article.

In still another form, in a manufacturing system, a self-adjusting radio frequency identification portal improves the readability of a radio frequency identification tag on an article moving relative to the portal. The portal includes telescoping carriage assemblies. Each of the telescoping carriage assemblies is adapted to hold a radio frequency identification reader. The portal also includes translator elements. Each of the telescoping carriage assemblies is movably mounted on at least one of the translator elements. The portal also includes a position sensing element for determining positional data of the article relative to the radio frequency identification reader. The portal also includes actuators for translating, along the translator elements, the telescoping carriage assemblies movably mounted thereon responsive to the positional data determined by the position sensing element to read the radio frequency identification tag associated with the moving article. The actuators are connected to the position sensing element.

Alternatively, the invention may comprise various other methods and apparatuses.

Other features will be in part apparent and in part pointed out hereinafter.

BRIEF DESCRIPTION OF THE DRAWINGS

FIG. 4 is an exemplary flow chart illustrating operation of an embodiment of the invention.

Corresponding reference characters indicate corresponding parts throughout the drawings.

DETAILED DESCRIPTION OF THE INVENTION

Figure 1:
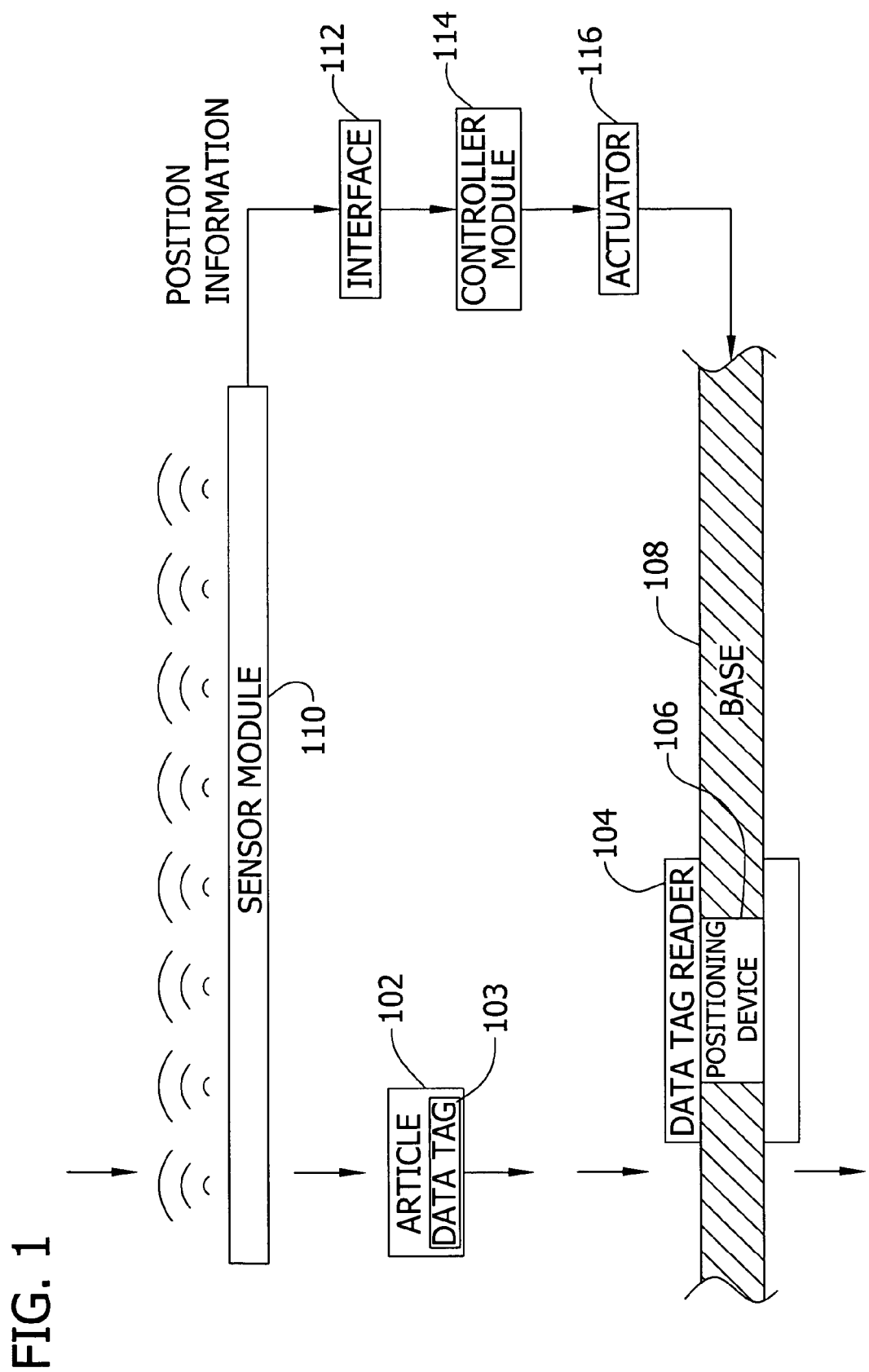
FIG. 1 is an exemplary block diagram illustrating a top view of an upper portal beam (e.g., a base) with a translatable positioning device to adjust the position of a data tag reader responsive to output from a sensor module.

A data tag, smart tag, or other identification means (e.g., a bar code) may be placed by hand or by machinery on an article. The data tag may be placed inside or outside of the article. The data tag stores identification information. In one embodiment, the information in the tag is used to assist in routing of the article in the manufacturing process. The data tag reader interrogates a data tag affixed to an article. The invention is operable with any form of data tag including, but not limited to, a smart tag and an active or passive radio frequency identification (RFID) tag.

Embodiments of the invention include a self-adjusting portal with movable data tag readers for improved reading of data tags on an article. For example, if a transporting device such as a forklift is carrying the article, and the location of the forklift as it approaches a portal is determined to be near the left side of the portal, a moveable reader on an upper beam of the portal may slide to the left to improve signal strength. Alternatively, if a pallet is approaching and is determined to have a short stack of objects (e.g., about three feet high), readers on the sides of the portal may automatically slide to a lower position such as about two feet above the ground to improve the read.

While some embodiments of the invention are described herein as being operable with radio frequency identification (RFID) systems, the invention is operable with any data tag means and data tag reader means. That is, the invention is not limited to RFID.

RFID smart tag technology is known and understood by those skilled in the art, and a detailed explanation thereof is not necessary for purposes of describing embodiments of the method and system according to the present invention. RFID systems for improved manufacturing have been proposed for systems including the PIPE/STORM systems disclosed in commonly owned U.S. patent application Ser. No. 10/306,794, "Communication Between Machines and Feed-Forward Control in Event-Based Product Manufacturing," filed Nov. 27, 2002 by Markham et al., which is herein incorporated by reference.

In general, RFID chips may be read-only chips, which include a fixed electronic code, or they may be read-write chips, which allow new information to be added. The chips may also be associated with sensors to read sensor information and transmit a signal responsive to the information, such as a value from a biosensor. Exemplary smart tags including RFID technology associated with a sensor are the active labels of KSW Microtec (Dresden, Germany), including TEMPSENS® active smart labels for measuring and recording temperature.

RFID tags can take many physical formats, such as a microchip from 30 to 100 microns thick and from 0.1 to 1 mm across, joined to a minute metal antenna such as the Hitachi 2.45 GHz Mew chip. Another form is the "Coil-on-Chip" system from Maxell (Tokyo, Japan). Exemplary RFID vendors of tags and/or readers and associated systems include Intermec Technologies Corporation (Everett, Wash.), Symbol Technologies (Holtsville, N.Y.), AWID (Monsey, N.Y.), Philips Semiconductor (Eindhoven, The Netherlands), and Texas Instruments (Dallas, Tex.).

Readers may also be integrated into or added onto a laptop, a personal data assistant (PDA) device, a cellular phone, or other electronic device. Readers for use in the present invention may include any known variety, including multi-protocol readers (e.g., those of AWID) that scan multiple frequencies or that are adapted for reading a variety of RFID tags or other identification elements. Data tag readers may also be adaptive readers that adjust their scanning frequency, signal strength, and/or signal orientation or direction to improve signal obtained from the tag or tags being read. Readers that adapt their frequency are discussed, by way of illustration, in U.S. Pat. No. 6,765,476, "Multilevel RF Identification System," issued Jul. 20, 2004 to Steele, herein incorporated by reference to the extent it is noncontradictory herewith.

Referring first to FIG. 1, an exemplary block diagram illustrates a top view of an upper portal beam (e.g., a base 108) with a translatable positioning device 106 to adjust the position of a data tag reader 104 responsive to output from a sensor module 110. In general, a portal unit through which articles pass comprises one or more data tag readers (e.g., scanners, transponders, interrogators, or antenna systems) such as data tag reader 104. For example, RFID portals for forklifts, pallets, and other loads are well known, such as the portals of Pelican Control Systems Ltd. (England) and that of U.S. Patent Publication 20020104013, "Electronic Vehicle Product and Personal Monitoring." Examples of other RFID portals include the Leads-Trakker portal for reading RFID tags on humans, such as guests at conventions wearing RFID-enable passes. Automated tollbooths using RFID scanners are also another form of portal within the scope of the present invention. However, the invention is not limited to RFID portals, and is operable with any form of portal.

In FIG. 1, an article 102 (e.g., a vehicle, a raw material in a manufacturing system, or a human) approaches a sensor module 110 and a base 108 associated with a portal. The article 102 has a data tag 103 mounted thereon. The base 108 (e.g., a worm gear) has mounted thereon a positioning device 106 (e.g., a carriage) holding the data tag reader 104. The positioning device 106 is capable of translation along the base 108 to position the data tag reader 104 in a desired location. The sensor module 110 includes one or more position sensing elements or other position sensors (e.g., motion sensors, video cameras, radar devices, metal detectors, eddy current detectors, pressure sensors embedded in a floor or mat, infrared sensors, and the like) for determining position information or other positional data describing the position of the approaching article 102 relative to the base 108. In one embodiment, the sensor module 110 and base 108 are aligned such that position information determined by the sensor module 110 correlates to a location on the base 108. The sensor module 110 and/or other elements described herein constitute a means for generating the position information.

The sensor module 110 communicates the determined position information to a controller module 114 via an interface 112. The controller module 114 processes the position information to determine a desired location of the data tag reader 104. The controller module 114 activates an actuator 116 (e.g., a motor) to move the positioning device 106 relative to the base 108 to locate the data tag reader 104 in the desired location. In another embodiment, base 108 includes an arm configured to pivot the positioning device 106 responsive to the position information.

The data tag reader 104 reads or scans the data tag 103 on the article 102 as the article 102 moves by the data tag reader 104. In one embodiment, movement of the article 102 is slowed or momentarily halted once the article 102 is within range of the data tag reader 104. The slowing or halting may be responsive to information obtained from the sensor module 110, from the data tag reader 104, or other information about the articles approaching the portal in order to provide adequate time for effective reading of the signal. For example, if the data tag reader 104 detects a weak signal with significant noise or interference, the article may need to halt or slow long enough for repeat readings, or long enough to allow the data tag reader 104 to iteratively try different locations or reading conditions to improve the read.

Self-adjustment of the data tag reader 104 in the desired location in the portal results in improved reading of the data tag 103. In addition to adjustment of the physical location of the data tag reader 104, it may undergo adjustments in frequency, signal strength, signal orientation, physical orientation (e.g., revolving to change its angle relative to the base 108), operational mode, etc. The data tag reader 104 may adjust its operation, for example, if it detects that the data tag 103 is an active tag with a strong signal, or tag operating at or optimized for a frequency other than the current frequency of the data tag reader 104. The data tag reader 104 may also, for example, adjust its signal strength and location in response to low measured response signals if the tag is too remote, or if there is interference from metal, fluids, or other materials, or if the orientation of the antennae associated with the tags is not well suited for the reader.

The controller module 114 operates on various input data within the scope of the invention. For example, the position information received from the sensor module 110 by the controller module 114 via the interface 112 may include, but is not limited to, a location of the moving article 102 relative to any of the following: the base 108, the data tag reader 104, the sensor module 110, and the positioning device 106. Further, in one embodiment, the position information includes global positioning system coordinates of the moving article 102. In many cases, a given load or product type coming though a portal may have known characteristics that can be used to modify the position of the readers for best results. The optimum positioning of one or more readers in the portal can be preprogrammed as a function of commonly received object types.

Information from systems such as logistics systems, SAP, or electronic data interchange (EDI) or bill of lading (BOL) systems can be used to send information to the portal about what is coming, so that the readers in the portal can be moved into optimum locations for the read. In another embodiment, the information may be received or obtained from a feed-forward process control system (see, for example, U.S. Patent Publication No. US20030155415-A1, "Communication between Machines and Feed-Forward Control in Event-Based Product Manufacturing," published Aug. 21, 2003 by Markham et al., previously incorporated by reference herein).

In the example of FIG. 1, the sensor module 110 is in communication with the controller module 114. In other embodiments, the sensor module 110 is physically associated with the positioning device 106 to determine information about the goods approaching or inside the portal, after which the data reader is automatically moved to an optimum position. For example, the sensor module 110 may include a vision system for detecting a dimension of the article 102 (e.g., the article is eight feet tall). In one embodiment, several data tag readers (not shown in FIG. 1) may be automatically distributed to cover an eight-foot vertical span. For a shorter article, the readers would be positioned at lower heights. In another example, the sensor module 110 includes infrared or ultrasonic sensors to determine that a stack of goods is positioned on the right side of the portal, whereupon some readers on an upper beam of the portal slide to the right to improve the read. In other embodiments, the sensor module determines other material characteristics of the approaching article 102.

The controller module 114 processes any of the different types of position information received from the sensor module 110 via the interface 112 to calculate a desired location of the data tag reader 104. The controller module 114 has knowledge of the location of the sensor module 110 relative to the base 108, as well as the current location of the translatable positioning device 106 relative to the base 108. Means for obtaining and maintaining this knowledge is known in the art.

In another embodiment, the sensor module 110 and the controller module 114 are computer-executable modules or components. That is, the sensor module 110 and the controller module 114 include hardware, software components, and/or a processor.

The sensor module 110 may be physically remote from the data tag reader 104 (e.g., separated by a distance of at least one meter, or at least about five meters), or may be physically near the data tag reader 104 (e.g., at least part of the sensor module 110 is within about one meter of the data tag reader 104).

In an alternative embodiment, the sensor module 110 and the data tag reader 104 may be integrated such that they are physically connected or attached to a common movable positioning device 106. For example, the sensor module 110 may include a sensor such as a video camera (or, alternatively, a motion detector, a directional antenna for detecting RFID tags, a photoelectric eye, etc.) for sensing the presence of objects, with the sensor mounted on or near the positioning device 106, such that the sensor may move with the data tag reader 104. In other embodiments, a sensor module 110 such as a camera may be near the base 108 and data tag reader 104, but does not move with the data tag reader 104.

In another embodiment, at least a part of the sensor module may be integrated with the article 102 or the data tag 103 associated with the article 102. For example, the article 102 or a device carrying the article (not shown) such as a forklift (e.g., see U.S. Pat. No. 6,669,089, "Radio Frequency Identification Systems for Asset Tracking," issued Dec. 30, 2003 to Cybulski et al.), automated guided vehicle, truck, shopping cart, etc., may be connected to or otherwise associated with a GPS device that emits a signal indicating its location which can be read by the data tag reader 104 or another device (not shown) cooperatively associated with the data tag reader 104. In this manner, the location of the approaching article 102 can be inferred and the position of the data tag reader 104 appropriately adjusted. The article 102 or a device transporting the article 102 alternatively may be joined to or cooperatively associated with a position detection system that uses cameras, RFID readers for reading floor-mounted RFID tags with known locations, or other means for tracking the location of the article 102, further adapted to communicate with the system shown in FIG. 1 such that the data tag reader 104 is positioned appropriately for optimum reading of the data tag 103 associated with the article 102.

In one embodiment, the location of the article 102 and/or the tag 103 associated with the article can be determined using RFID technology. In addition to the previously mentioned use of a moveable reader associated with an article or transporting device for the article, wherein fixed tags with known locations are read to determine the position of an the article, a warehouse or other environment can also comprise a plurality of readers mounted at fixed locations which detect the presence of the data tag 103 on the article 102 or the presence of another active or passive tag (not shown) mounted on a transporting device that is carrying the article 102. When a reader at a known location detects the presence of the data tag 103 on the article 102 or the presence of another tag (not shown) on the transporting device (not shown), the location of the article 102 can be inferred.

RFID can be applied in other ways to determine the location of the article 102. This can be done, for example, using triangulation involving a plurality of RFID readers that read the tag, or with directional readers that scan for the location of a tag. See, for example, J. Lindsay, "Retail RFID Systems without Smart Shelves," published at IP.com as Document 21114D, Dec. 23, 2003, herein incorporated by reference. A directional reader with a directional and optionally moveable antenna or antenna array adapted to determine the approximate location of an RFID tag may be mounted on or near the positioning device 106, or remote therefrom, or may be the data tag reader 104 itself of FIG. 1. One example of a reader system adapted for determining the spatial location of a tag is taught by D. G. Bauer et al. in "Intelligent Station Using Multiple RF Antennae and Inventory Control System and Method Incorporating the Same," U.S. Patent Publication 200030174099-A1, published Sep. 18, 2003, filed as U.S. patent application Ser. No. 10/338,892, assigned to MeadWestvaco Corporation, herein incorporated by reference to the extent it is noncontradictory herewith. Another approach is described in U.S. Pat. No. 6,750,769, "Method and Apparatus for Using RFID Tags to Determine the Position of an Object," issued Jun. 15, 2004 to R. B. Smith, herein incorporated by reference to the extent it is noncontradictory herewith. The system of Smith employs an array of RFID tags, some of which are obscured relative to a reader by the presence of an intervening object. Analysis of the obscured and non-obscured signals provides spatial information about the object.

Figure 2:
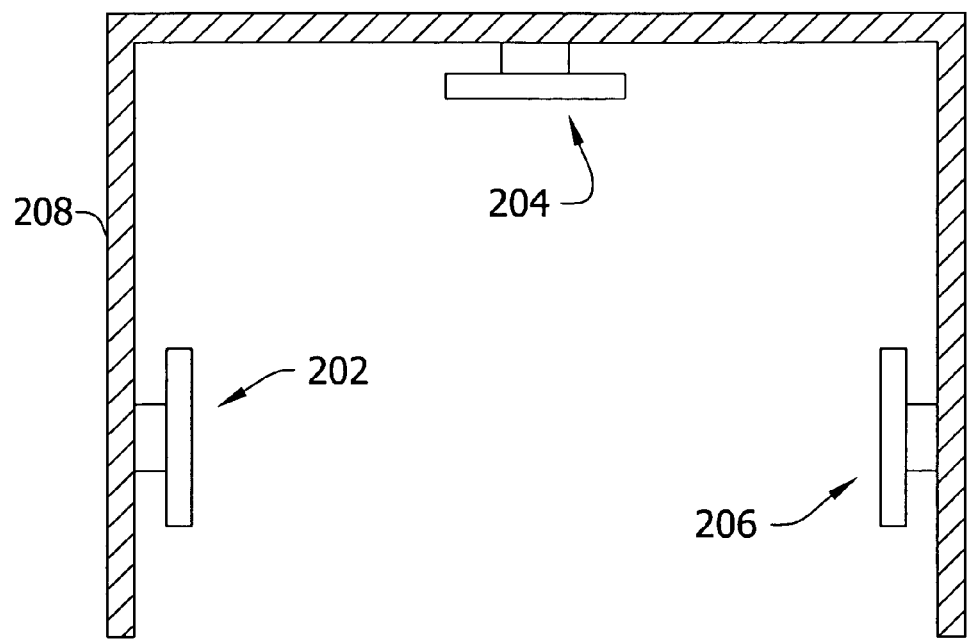
FIG. 2 is an exemplary block diagram illustrating a portal having three data tag readers mounted on worm gears.

Referring next to FIG. 2, an exemplary block diagram illustrates a portal having three data tag readers mounted on worm gears or other translator elements. In this embodiment, the article 102 moves through the center of the portal. The data tag readers translate along the worm gears to achieve improved reading of the data tag 103 on the moving article 102. Translation of the data tag readers may be along the sides of the portal (e.g., rails) as shown in FIG. 2, but translation in any desired direction is within the scope of the invention. For example, embodiments of the invention are operable with a three dimensional position control system. In addition, some readers may be fixed relative to the worm gears. Other translator elements are within the scope of the invention. For example, in addition to worm gears, the translator elements may include belts, pulleys, chains, cables, and/or other position adjusting means.

Figure 3A:
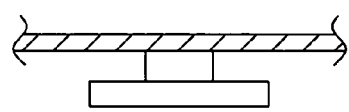
FIG. 3A and FIG. 3B are exemplary block diagrams illustrating a telescoping data tag reader assembly mounted on a worm gear.
Figure 3B:
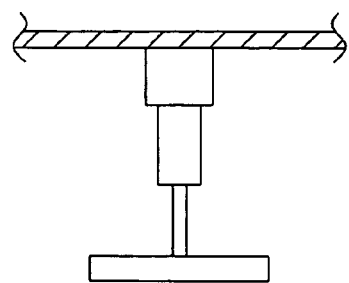

Referring next to FIG. 3A and FIG. 3B, exemplary block diagrams illustrate a telescoping data tag reader assembly mounted on a worm gear. The telescoping assembly moves the data tag reader towards or away from goods in or near the portal. The assembly includes a telescoping means for extending and retracting the data tag reader relative to the worm gear. FIG. 3A shows the data tag reader assembly retracted. FIG. 3B shows the data tag reader assembly extended. The telescoping data tag reader assembly positions the data tag reader in an optimal location for reading the data tag 103 on the moving article (e.g., article 102).

Referring next to FIG. 4, an exemplary flow chart illustrates operation of an embodiment of the invention. The embodiment operates to determine at 402 position information for an article such as article 102 relative to a data tag reader such as data tag reader 104, calculate at 404 a desired location of the data tag reader based on the determined position information, activate at 406 an actuator to move the data tag reader to the desired location, and scan at 408 a data tag such as data tag 103 on the article as the article passes by the data tag reader. In one embodiment, one or more computer-readable media have computer-executable instructions for performing the method illustrated in FIG. 4.

In one embodiment, the portal reads the codes on multiple data tags associated with items that pass through the portal. Portals can be adapted according to the present invention for taking readings of data tags associated with virtually anything such as pallets, cases, carts, automatically guided vehicles (AGVs), shopping carts, human beings, cars, trucks, train cars, subway vehicles, items on a carrier belt, items conveyed by pneumatic tubes, continuous webs, etc., which constitute means for moving items through the portal (e.g., a means for moving the article relative to the base).

Exemplary Operating Environment

The invention is operable with any form of computer or computing device known in the art. A user may enter commands and information into the computing device through input devices or user interface selection devices well known in the art such as a keyboard and a pointing device (e.g., a mouse, trackball, pen, or touch pad). The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

It is to be understood that many other technologies are potential substitutes for the RFID embodiments disclosed herein. For example, RFID readers could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an identification code, then transforms it to another radio signal that is emitted by the smart tag and read by a scanner. The identification code of the smart tag is extracted from the radio signal. RFSAW, Inc. (Dallas, Tex.) also provides minute Surface Acoustic Wave (SAW) RFID devices that may be used within the scope of the present invention.

Another related technology is ultra-wide band (UWB) technology. UWB technology permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A system for reading a data tag on an article as the article is moving relative to a base, said system comprising:
a positioning device movably mounted on said base; and
a data tag reader mounted on said positioning device, said data tag reader being adapted to read a data tag mounted on the moving article, said positioning device being configured to move relative to the base and responsive to position information of the article relative to the reader, said positioning device being responsive to the position information for improved reading of the data tag, wherein the data tag reader comprises an antenna, and wherein the antenna extends and retracts responsive to the position information.

2. The system of claim 1, further comprising a means for generating the position information.

3. The system of claim 1, wherein the positioning device extends and retracts responsive to the position information.

4. The system of claim 1, wherein the base comprises an arm, and wherein the arm is configured to pivot the positioning device responsive to the position information.

5. The system of claim 1, wherein the positioning device comprises a carriage, and wherein the carriage is configured to move relative to the base responsive to the position information.

6. The system of claim 1, wherein the data tag reader comprises a radio frequency identification reader.

7. The system of claim 1, wherein the position information comprises a material characteristic of the article.

8. The system of claim 1, wherein the position information comprises a dimension of the article.

9. The system of claim 1, wherein the position information comprises a location of the data tag on the article.

10. The system of claim 1, wherein the position information comprises a desired location of the positioning device relative to the base.

11. The system of claim 1, further comprising a controller for receiving the position information and moving the positioning device responsive to the received position information.

12. The system of claim 1, wherein the positioning device is responsive to the position information to increase reception of a signal emitted by the data tag.

13. The system of claim 1, wherein the positioning device is responsive to the position information to increase the response of the data tag.

14. The system of claim 1, wherein the article comprises a raw material.

15. The system of claim 1, further comprising a means for moving the article relative to the base.

16. The system of claim 15, wherein the means for moving the article relative to the base comprises one or more of the following: a forklift, a shopping cart, a motor vehicle, an automatically guided vehicle, a pallet, a case, a human being, a train car, a subway vehicle, a carrier belt, pneumatic tubes, and continuous webs.

17. A system for reading a data tag on an article as the article is moving relative to a data tag reader, said system comprising:
 a data tag reader for reading the data tag, wherein the data tag reader comprises an antenna configured to telescope responsive to position information of the article relative to the data tag reader;
 a processor configured for determining, responsive to article data, a desired movement of the data tag reader relative to the data tag;
 an interface for receiving data describing the desired movement determined by the processor; and
 a carriage connected to the interface, said data tag reader being mounted on said carriage, said carriage being capable of the desired movement.

18. The system of claim 17, further comprising a controller for moving the carriage.

19. The system of claim 18, wherein the controller comprises an actuator for moving the carriage.

20. The system of claim 17, further comprising the article data.

21. The system of claim 17, further comprising a motor for moving the carriage.

22. The system of claim 17, wherein carriage is mounted on a worm gear.

23. The system of claim 17, further comprising a sensor for determining a location of the article, said article data comprising the determined location.

24. The system of claim 23, wherein the sensor comprises one or more of the following: a position sensing element, a position sensor, a motion sensor, a video camera, a radar device, a metal detector, an eddy current detector, a pressure sensor embedded in a floor or mat, and an infrared sensor.

25. The system of claim 17, wherein the article data comprises a location of the data tag relative to the article.

26. The system of claim 17, wherein the carriage moves the data tag reader relative to the data tag to increase reception of a signal emitted by the data tag.

27. The system of claim 17, wherein the carriage moves the data tag reader relative to the data tag to increase the response of the data tag.

28. The system of claim 17, wherein the article comprises a raw material.

29. A system for reading a data tag on an article as the article is moving relative to a data tag reader, said system comprising:
 a data tag reader for reading the data tag, wherein the data tag reader comprises an antenna configured to telescope responsive to position information of the article relative to the data tag reader;
 an interface for receiving article data;
 a processor configured for determining, responsive to the article data received by the interface, a desired movement of the data tag reader relative to the data tag; and
 a carriage, said data tag reader being mounted on said carriage, said carriage being capable of the desired movement determined by the processor.

30. A computer-implemented method for adjusting the position of a data tag reader relative to a data tag to improve the readability of the data tag by the data tag reader, said computer-implemented method comprising:
 determining position information for the article relative to the data tag reader, wherein the data tag reader comprises an antenna configured to telescope responsive to the determined position information for the article relative to the data tag reader; and
 moving the data tag reader responsive to the determined position information to improve reading by the data tag reader of the data tag on the moving article.

31. The computer-implemented method of claim 30, wherein determining the position information comprises receiving the position information from a sensor.

32. The computer-implemented method of claim 30, wherein determining the position information comprises receiving the position information from a process control system.

33. The computer-implemented method of claim 30, wherein moving the data tag reader comprises moving the data tag reader responsive to the determined position information to increase reception of a signal emitted by the data tag.

34. The computer-implemented method of claim 30, wherein moving the data tag reader comprises moving the data tag reader responsive to the determined position information to increase the response of the data tag.

35. The computer-implemented method of claim 30, wherein determining the position information comprises determining the position information for the data tag on the article relative to the data tag reader.

36. The computer-implemented method of claim 30, wherein one or more computer-readable media have computer-executable instructions for performing the computer-implemented method of claim 32.

37. One or more computer-readable media having computer-executable components for improving the readability of a data tag on an article moving relative to a data tag reader, said components comprising:
 a sensor module for determining position information for the article relative to the data tag reader; and
 a controller module for moving the data tag reader responsive to the position information determined by the sensor module to improve reading by the data tag reader of the data tag on the moving article, wherein the data tag reader comprises an antenna configured to telescope responsive to the determined position information for the article relative to the data tag reader.

38. The computer-readable media of claim 37, wherein the sensor module receives the position information from a process control system.

39. The computer-readable media of claim 37, wherein the controller module moves the data tag reader responsive to the position information determined by the sensor module to increase reception of a signal emitted by the data tag.

40. The computer-readable media of claim 37, wherein the controller module moves the data tag reader responsive to the position information determined by the sensor module to increase the response of the data tag.

41. The computer-readable media of claim 37, wherein the article comprises a raw material.

42. In a manufacturing system, a self-adjusting radio frequency identification portal for improving the readability of a radio frequency identification tag on an article moving relative to the portal, said portal comprising:
 telescoping carriage assemblies, each of said telescoping carriage assemblies being adapted to hold a radio frequency identification reader;
 translator elements, each of said telescoping carriage assemblies being movably mounted on at least one of the translator elements;
 a position sensing element for determining positional data of the article relative to the radio frequency identification reader, wherein the radio frequency identification reader comprises an antenna configured to telescope responsive to the determined positional data of the article relative to the radio frequency identification reader; and actuators for translating, along the translator elements, the telescoping carriage assemblies movably mounted thereon responsive to the positional data determined by the position sensing element to read the radio frequency identification tag associated with the moving article, said actuators being connected to the position sensing element.

43. The portal of claim 42, wherein the translator elements comprise one or more of the following: worm gears arranged to create a frame, belts, pulleys, chains, and cables.

44. The portal of claim 42, wherein the article comprises a vehicle.

45. The portal of claim 42, wherein the article comprises a raw material.

46. The portal of claim 42, wherein the actuators translate the telescoping carriage assemblies responsive to the positional data determined by the position sensing element to increase reception of a signal emitted by the radio frequency identification tag.

47. The portal of claim 42, wherein the actuators translate the telescoping carriage assemblies responsive to the positional data determined by the position sensing element to increase the response of the radio frequency identification tag.

* * * * *

UNITED STATES PATENT AND TRADEMARK OFFICE
CERTIFICATE OF CORRECTION

| | |
|---|---|
| PATENT NO. | : 7,221,269 B2 |
| APPLICATION NO. | : 10/976993 |
| DATED | : May 22, 2007 |
| INVENTOR(S) | : Onderko et al. |

Page 1 of 1

It is certified that error appears in the above-identified patent and that said Letters Patent is hereby corrected as shown below:

Title Page 2, at line 20:
In section FOREIGN PATENT DOCUMENTS delete "EP 04345424 1/1992" and insert therefor -- JP 04345424 1/1992 --.

Signed and Sealed this

Tenth Day of November, 2009

David J. Kappos
*Director of the United States Patent and Trademark Office*